(12) United States Patent
Smith

(10) Patent No.: US 12,291,170 B2
(45) Date of Patent: May 6, 2025

(54) TELESCOPING BED PLATFORM

(71) Applicant: Adventure Wagon LLC, Tualatin, OR (US)

(72) Inventor: Chad Smith, Portland, OR (US)

(73) Assignee: Adventure Wagon LLC, Portland, OR (US)

( * ) Notice: Subject to any disclaimer, the term of this patent is extended or adjusted under 35 U.S.C. 154(b) by 439 days.

(21) Appl. No.: 17/870,602

(22) Filed: Jul. 21, 2022

(65) Prior Publication Data

US 2022/0355739 A1 Nov. 10, 2022

Related U.S. Application Data

(63) Continuation of application No. 17/150,875, filed on Jan. 15, 2021, now Pat. No. 11,427,129, which is a continuation of application No. 16/410,869, filed on May 13, 2019, now Pat. No. 10,933,813.

(60) Provisional application No. 62/670,586, filed on May 11, 2018.

(51) Int. Cl.
*B60R 5/04* (2006.01)

(52) U.S. Cl.
CPC .................................. *B60R 5/045* (2013.01)

(58) Field of Classification Search
CPC ............. B60R 5/045; A47C 17/80; B60P 3/38
USPC ....................................................... 296/26.12
See application file for complete search history.

(56) References Cited

U.S. PATENT DOCUMENTS

| | | |
|---|---|---|
| 2,656,223 A | 10/1953 | Gray |
| 2,656,233 A | 10/1953 | Gray |
| 3,338,423 A | 8/1967 | Wellman, Jr. |
| 3,450,072 A | 6/1969 | Farkas |
| D247,532 S | 3/1978 | Tenney |
| 4,144,601 A | 3/1979 | Anderson |
| 4,278,175 A | 7/1981 | Jackson |
| D262,365 S | 12/1981 | Butler |
| D291,520 S | 8/1987 | Melvin |

(Continued)

FOREIGN PATENT DOCUMENTS

| | | |
|---|---|---|
| CN | 107672513 | 2/2018 |
| EM | 0080419410001 | 7/2020 |

(Continued)

OTHER PUBLICATIONS

*Adventure Wagon LLC* vs. *RB Components, Inc.*, Case No. 2:22-cv-7737-JAK-MAR, Answer and Counterclaim dated Dec. 16, 2022.

(Continued)

*Primary Examiner* — Pinel E Romain

(74) *Attorney, Agent, or Firm* — Fitch, Even, Tabin & Flannery LLP

(57) ABSTRACT

Disclosed is a bed platform and system for use in an enclosed or partly enclosed space, such as, a cargo space of a vehicle, such as, a van, camper, or truck, among others. By one approach, the bed platform consists of interleaved portions of panel portions that permit relative lateral motion of the panels. In some configurations, the panel portions are adjustable such that the bed platform can be fit into differently sized vehicle cargo spaces. In addition, the systems described herein also may permit the bed platform to be adjusted or moved to different heights even though the wall configurations may be different along the height thereof.

23 Claims, 15 Drawing Sheets

(56) References Cited

U.S. PATENT DOCUMENTS

| | | | |
|---|---|---|---|
| 4,919,467 | A | 4/1990 | Guimelli |
| 5,042,863 | A | 8/1991 | Fraga |
| 5,518,125 | A | 5/1996 | Colosimo |
| 5,639,141 | A | 6/1997 | Hanemaayer |
| D393,622 | S | 4/1998 | Goertzen |
| D405,306 | S | 2/1999 | Wilkening |
| 6,263,527 | B1 | 7/2001 | Ross |
| D467,862 | S | 12/2002 | Jenkins |
| 6,585,306 | B1 | 7/2003 | Smith |
| D481,003 | S | 10/2003 | Bauer |
| D490,042 | S | 5/2004 | Bailey |
| 6,735,797 | B1 | 5/2004 | Long |
| D493,414 | S | 7/2004 | Condos |
| D494,921 | S | 8/2004 | Taylor |
| 7,147,415 | B2 | 12/2006 | Rorie |
| D553,553 | S | 10/2007 | Taylor |
| 7,293,813 | B2 | 11/2007 | Squyres |
| 7,325,860 | B2 | 2/2008 | Day |
| 7,347,484 | B2 | 3/2008 | Nebel |
| 7,431,366 | B2 * | 10/2008 | Sankrithi ............. B62D 47/003 296/64 |
| 7,636,964 | B2 | 12/2009 | Bengtsson |
| 7,854,460 | B2 | 12/2010 | Tweet |
| D633,856 | S | 3/2011 | Kennedy |
| 8,123,283 | B2 | 2/2012 | Edwards |
| 8,496,281 | B2 | 7/2013 | Thygesen |
| 8,635,727 | B2 | 1/2014 | Dahlin |
| 8,776,284 | B2 | 7/2014 | Jones |
| D713,775 | S | 9/2014 | Lagermann |
| 9,168,875 | B2 | 10/2015 | Haler |
| 9,211,842 | B2 | 12/2015 | Gaas |
| 9,421,921 | B2 | 8/2016 | Manlick |
| 9,545,871 | B2 | 1/2017 | Quigley |
| 9,809,140 | B2 | 11/2017 | Saunders |
| 10,889,229 | B2 | 1/2021 | Frost |
| D912,605 | S | 3/2021 | Miller |
| D914,581 | S | 3/2021 | Cassway |
| 10,933,813 | B2 | 3/2021 | Smith |
| D921,568 | S | 6/2021 | Xia |
| D930,553 | S | 9/2021 | Suckling |
| D939,423 | S | 12/2021 | Williams |
| D944,182 | S | 2/2022 | Badillo |
| D946,491 | S | 3/2022 | Wissiak |
| D947,100 | S | 3/2022 | Linn |
| D951,850 | S | 5/2022 | Hanson |
| D957,309 | S | 7/2022 | Su |
| D964,251 | S | 9/2022 | Voss |
| D985,467 | S | 5/2023 | Ting |
| D999,708 | S | 9/2023 | Smith |
| D1,002,494 | S | 10/2023 | Dildy |
| D1,007,396 | S | 12/2023 | Geiger |
| D1,010,547 | S | 1/2024 | Smith |
| D1,028,820 | S | 5/2024 | Smith |
| 2010/0325810 | A1 | 12/2010 | Dahlin |
| 2013/0306694 | A1 | 11/2013 | Langseder |
| 2014/0375074 | A1 * | 12/2014 | Ronsen .................. B60P 3/20 296/24.35 |
| 2015/0041601 | A1 | 2/2015 | Quigley |
| 2016/0144767 | A1 | 5/2016 | Snell |
| 2016/0339967 | A1 | 11/2016 | Avila |
| 2019/0344719 | A1 | 11/2019 | Smith |

FOREIGN PATENT DOCUMENTS

| | | |
|---|---|---|
| EM | 0080419410002 | 7/2020 |
| EP | 0705547 | 4/1996 |
| EP | 1385405 | 2/2004 |
| EP | 1754628 | 2/2007 |
| EP | 2993080 | 3/2016 |
| FR | 2419374 | 10/1979 |
| JP | 2595171 | 3/1997 |
| JP | 2004237923 | 8/2004 |
| JP | 2010184576 | 8/2010 |

OTHER PUBLICATIONS

International Patent Application No. PCT/US2019/031859, International Search Report, dated Aug. 14, 2019, 3 pages.
International Patent Application No. PCT/US2019/031859, Written Opinion, dated Aug. 14, 2019, 9 pages.
CheapRVLiving "Building a Sliding, Pull-Out Bed in a Van," dated Dec. 9, 2015.
Instagram Post by RB Components, Aug. 19, 2013.
Instagram Post by RB Components, Feb. 13, 2014.
Instagram Post by RB Components, Feb. 17, 2016.
Instagram Post by RB Components, Feb. 26, 2014.
Jamiecarnie "Another Van Conversion—Converting a 2001 Mercedes Sprinter into a camper van," dated Sep. 14, 2015.
REI.com "DIY Van Life: How to Make a Sleeping Platform," dated Apr. 3, 2018.
Sprinter Camper "How to build a Sprinter Camper Van," dated Aug. 12, 2015.
Vanlife "How to Fit a Qeen-sized Bed in Your Van: Badass Pullout Bed Frame Design," dated "Updated" Jul. 12, 2022.
Adventure Wagon Instagram (https://www.instagram.com/p/BJ81JteAvFy/?igshid=MWQ1ZGUxMzBKMA%3D%3D), Sept. 4, 2016.
Adventure Wagon Instagram (https://www.instagram.com/p/BTPcLD8DGhC/?igshid=MWQ1ZGUxMzBkMA%3D%3D), Apr. 23, 2017.
CheapRVLiving "Building a Sliding, Pull-Out Bed in a Van," https://cheaprvliving.com/building-a-sliding-pull-out-bed-in-a-van/, dated Dec. 9, 2015.
Instagram Post by Adventure Wagon, https://www.instagram.com/p/BKCjULwAVYL/?hl=en, Sep. 6, 2016.
Instagram Post by Adventure Wagon, https://www.instagram.com/p/BT7uXIhFPMy/?hl=en, May 10, 2017.
Instagram Post by RB Components, https://www.instagram.com/p/BB6iR-zpqNj/?hl=en, Feb. 17, 2016.
Instagram Post by RB Components, https://www.instagram.com/p/BOVo2XygctT/?hl=en, Dec. 22, 2016.
Instagram Post by RB Components, https://www.instagram.com/p/dDY6S-JqKG/?hl=en, Aug. 15, 2013.
Instagram Post by RB Components, https://www.instagram.com/p/dN4DpHpqHN/, Aug. 19, 2013.
Instagram Post by RB Components, https://www.instagram.com/p/k5tJFPpqHV/?hl=en, Feb. 26, 2014.
Instagram Post by RB Components, https://www.instagram.com/p/kXif1oJqNg/?hl=en, Feb. 13, 2014.
Instagram Post by RB Components, https://www.instagram.com/p/xzaLIDpqOf/?hl=en, Jan. 13, 2015.
Jamiecarnie "Another Van Conversion—Converting a 2001 Mercedes Sprinter into a camper van," https://anothervanconversion.wordpress.com/2015/09/14/constructing-the-bedframe/, dated Sep. 14, 2015.
REI.com "DIY Van Life: How to Make a Sleeping Platform," https://www.rei.com/blog/camp/diy-vanlife-how-to-make-a-sleeping-platform, dated Apr. 3, 2018.
Sprinter Camper "How to build a Sprinter Camper Van," https://sprinter-camper.com/building-bed-sprinter-camper/, dated Aug. 12, 2015.
Vanlife "How to Fit a Qeen-sized Bed in Your Van: Badass Pullout Bed Frame Design," dated "Updated," https://gnomadhome.com/diy-van-build-pullout-bed-frame/, Jul. 12, 2022.
Correspondence from Ms. Katherine Bond to Mr. Allen Hoover, Dec. 30, 2022.
Counterclaim filed by RB Components in *Adventure Wagon LLC v. RB Components Inc.*, case No. 2:22-cv-7737-JAK-MAR, filed Jan. 13, 2023.
Instagram Post by Adventure Wagon, May 10, 2017.
Instagram Post by Adventure Wagon, Sep. 6, 2016.
Instagram Post by RB Components, Aug. 15, 2016.
Instagram Post by RB Components, Dec. 22, 2016.
Instagram Post by RB Components, Jan. 13, 2015.
Screenshots from a video Facebook post by FreedomVans, https://www.facebook.com/freedomvans/videos/1022709294446513, Sep. 30, 2015, retrieved Feb. 6, 2023.

(56) References Cited

OTHER PUBLICATIONS

Screenshots of YouTube video from Into The Mystery 13, "Van Build 2pt. 12 Bed Ultimate Astro Stealth Camper Van Dwelling Build How To," https://www.youtube.com/watch?app=desktop&v=GloS0fIUWUw, Jul. 15, 2016, retrieved Feb. 6, 2023.
Transcript of YouTube video from Into The Mystery 13, "Van Build 2pt.12 Bed Ultimate Astro Stealth Camper Van Dwelling Build How To," https://www.youtube.com/watch?app=desktop&v=GloS0fIUWUw, Jul. 15, 2016, retrieved Jan. 5, 2023.
"Lost in Transit," lostintransit.net/the-van/building-furniture-the-bed, Aug. 7, 2014, retrieved Jan. 5, 2023.
Vandog Traveller, "An extending bed in my DIY van conversion," https://vandogtraveller.com/expanding-bed-for-van/, Nov. 30, 2013, retrieved Jan. 5, 2023.
Transcript of Wranglerstar, "How to Build a Removable Van Bed," https://www.youtube.com/watch?v=VbEt_rAour0, Nov. 2017, retrieved Jan. 5, 2023.
Facebook post by FreedomVans, https://www.facebook.com/photo?fbid=1095904743793634&set=pcb.1095905310460244, Feb. 19, 2016, retrieved Feb. 6, 2023.
Transcript of YouTube video from Lost In Transit article, Rickvanman—Variety Channel, "Self-Build Motorhome Cupboad Doors on a Budget, for the Carpentry-Challenged!," https://www.youtube.com/watch?v=pCstPTu8DTQ, Apr. 21, 2013, retrieved Jan. 5, 2023.
Screenshots of Wranglerstar, "How to Build a Removable Van Bed," https://www.youtube.com/ watch?v=VbEt_rAour0, Nov. 2017, retrieved Feb. 6, 2023.
Anywhere Adventures, How To Build A Slatted Sofa Bed, https://www.youtube.com/watch?v=UGXvTSB9Tnw, Apr. 14, 2018.
DIY Sprinter Van, "L-Track tie down anchor comparison," https://www.youtube.com/watch?v=V-gXjrlxls8, Nov. 9, 2015.
CargoEquipmentCorp, "L-Track accessories," https://www.youtube.com/watch?v=vcos-X1bYim, Feb. 19, 2014.
Acme Metal Products of North Carolina, "Wooden Side Rail Bed Replacement Set-Up with Acme Metal Products," https://www.youtube.com/watch?v=Ude91MhbX2k, Dec. 19, 2015.
Ex Parte Request by Third Party for U.S. Pat. No. 11,427,129, U.S. Appl. No. 90/019,172, filed Mar. 10, 2023, 80 pages.
Ex Parte Request by Third Party for U.S. Pat. No. 10,933,813, U.S. Appl. No. 90/019,171, filed Mar. 10, 2023, 58 pages.
Plaintiff Adventure Wagon LLC's Responses to Requests for Admission, Set One (1-26) for Case No. 2:22-cv-07737-JAK-MAR dated Mar. 24, 2023.
Defendant RB Components, Inc.'s Objections and Responses to Plaintiff's First Set of Interrogatories (1-11) for Case No. 2:22-cv-07737-JAK-MAR dated Mar. 24, 2023.
Plaintiff Adventure Wagon LLC's Redacted Responses to Interrogatories, Set One (1-8) for Case No. 2:22-cv-07737-JAK-MAR dated Mar. 24, 2023.
Defendant RB Components, Inc.'s Preliminary Invalidty Contentions for Case No. 2:22-cv-07737-JAK-MAR dated Mar. 24, 2023.
Exhibits 1-13 for Invalidity Contentions for Case No. 2:22-cv-07737-JAK-MAR dated Mar. 24, 2023.
Transcript and Screenshots of Anywhere Adventures, How to Build a Slatted Sofa Bed, https://www.youtube.com/watch?v=UGXvTSB9Tnw, Apr. 14, 2018, retreived Mar. 27, 2023.
Transcript and Screenshots of DIY Sprinter Van, "L-Track tie down anchor comparison," https://www.youtube.com/watch?v=V-gXjrlxls8, Nov. 9, 2015, retrieved Mar. 27, 2023.
Screenshots of CargoEquipmentCorp, "L-Track accessories," https://www.youtube.com/watch?v=vcos-X1bYim, Feb. 19, 2014, retreived Mar. 27, 2023.
Transcript and Screenshots of Acme Metal Products of North Carolina, "Wooden Side Rail Bed Replacement Set-Up with Acme Metal Products," https://www.youtube.com/watch?v=Ude91MhbX2k, Dec. 19, 2015, retreived Mar. 27, 2023.
USPTO Order Granting Request for Ex Parte Reexamination for U.S. Appl. No. 90/019,173 mailed Mar. 30, 2023.
USPTO Order Granting Request for Ex Parte Reexamination for U.S. Appl. No. 90/019,171 mailed Mar. 30, 2023.
Adventure Wagon.com, Van Conversion, Aug. 16, 2022, https://adventurewagon.com/pages/interiorsystem (Year: 2022).

\* cited by examiner

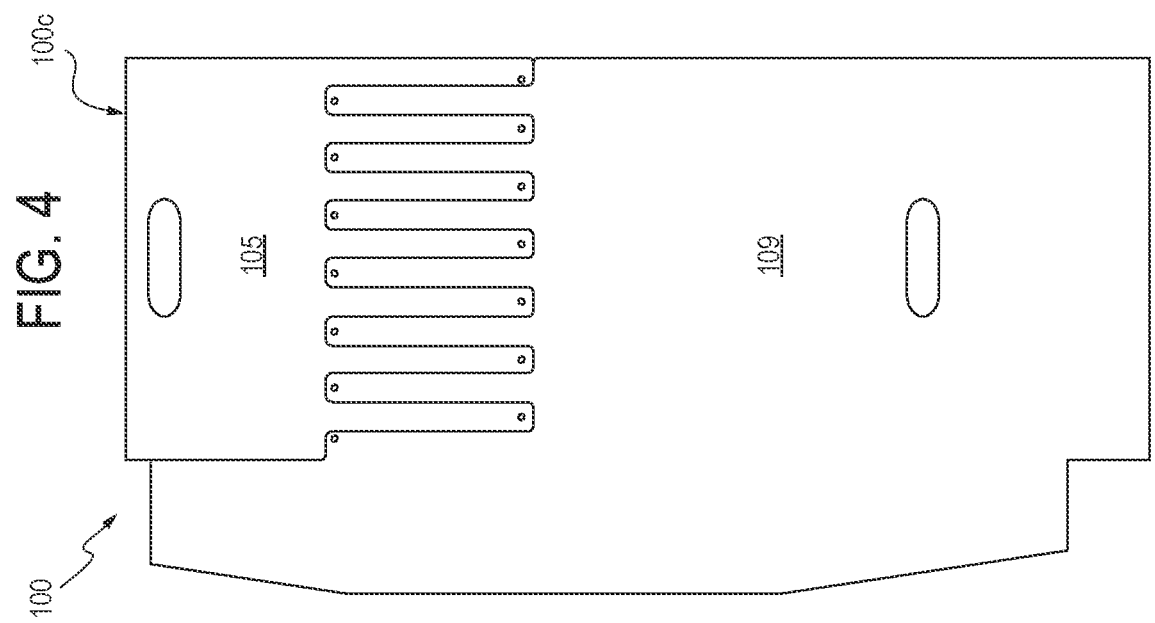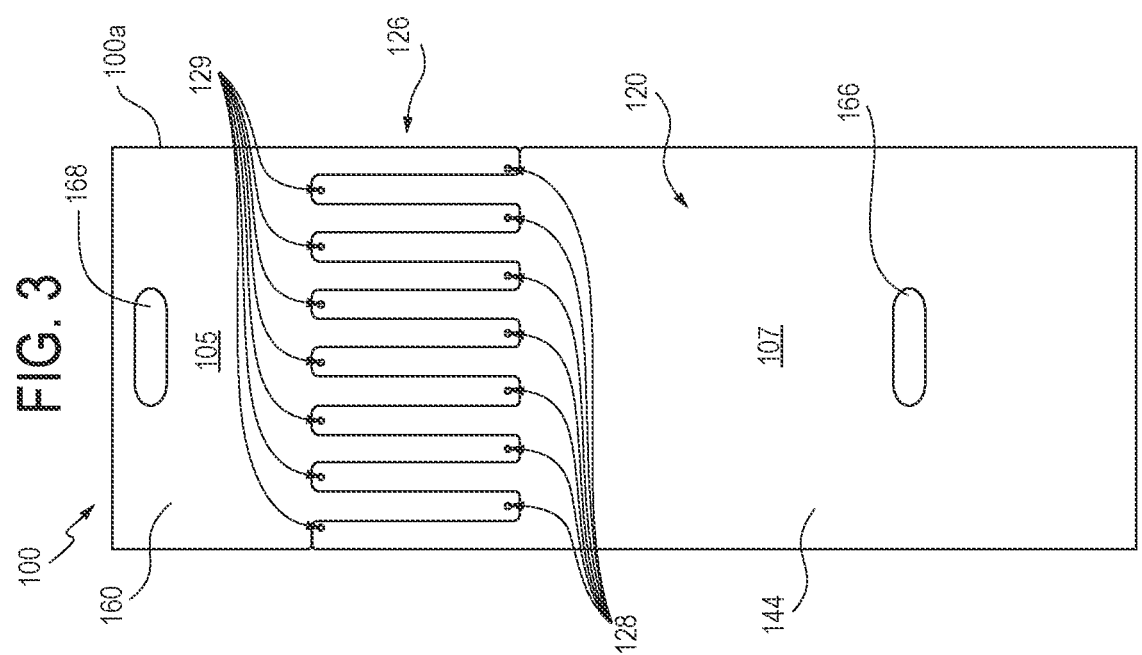

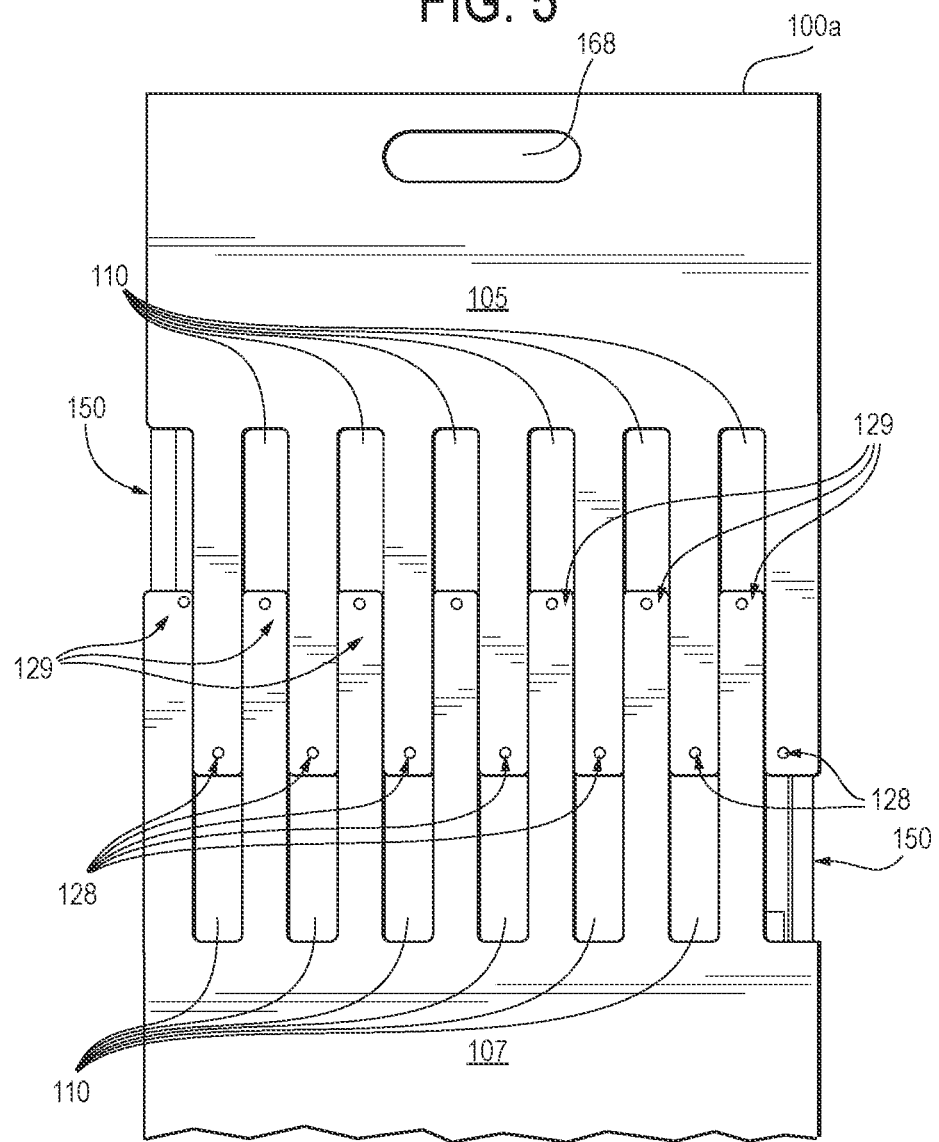

TELESCOPING BED PLATFORM

CROSS-REFERENCE TO RELATED APPLICATION(S)

The present application is continuation of U.S. patent application Ser. No. 17/150,875 filed on Jan. 15, 2021, which is a continuation of U.S. patent application Ser. No. 16/410,869 filed on May 13, 2019, which claims the benefit of U.S. Provisional Application No. 62/670,586 filed May 11, 2018, each of which are incorporated herein by reference in their entireties.

TECHNICAL FIELD

The invention generally relates to a utility platform for use in a passenger vehicle such as a van, camper, or truck or other enclosed or partly enclosed spaces.

BACKGROUND

Prior bed platforms for use in vehicles, such as vans, typically, are specifically designed to fit a particular dimension of the vehicle and are generally set at a specific height or location once installed. For example, to install a conventional bed platform into a vehicle, L-brackets are mounted to the walls of the vehicle and the bed is then mounted to the L-brackets. Such bed platforms typically have a fixed length and are generally not adjustable.

Further, in light of their fixed length, even if they are height adjustable, the shape of the cargo space may cause problems for such adjustment. More particularly, because the cargo walls of a conventional vehicle are typically not straight along their height, moving a conventional bed platform up or down along the vertical dimension (height) of a vehicle generally causes the bed platform to be too long or too short (or too wide or too narrow) to fit the width of the vehicle. If the platform is too long to fit the width of the vehicle, then the bed platform may not be stably supported in a level or generally horizontal orientation. If the bed platform is too short, then the bed platform will not be able to be mounted to the walls of the vehicle or there will be a margin between the edge of the bed and the interior wall of the vehicle. In this manner, the margin around the platform may permit unwanted lateral motion of the platform bed, which may make the installation unstable, even though it is mounted to the interior walls of the cargo space of the vehicle. This margin also may be a space into which items or persons may accidentally fall. The process of installing a conventional bed platform is also generally time consuming given the precision required to avoid having a platform that does not fit or has a significant margin that permits relative movement.

BRIEF DESCRIPTION OF THE DRAWINGS

FIG. 3 is a top view illustrating an individual panel of a modular telescoping bed platform in a fully retracted configuration.

FIG. 4 is a top view illustrating an individual panel of a modular telescoping bed platform having an extend portion so to cause the extended portion to abut or be near the rear doors of the vehicle.

FIG. 5 is a top view illustrating a portion of an individual panel of a modular telescoping bed platform in open, extended configuration.

DETAILED DESCRIPTION

Figure 1:
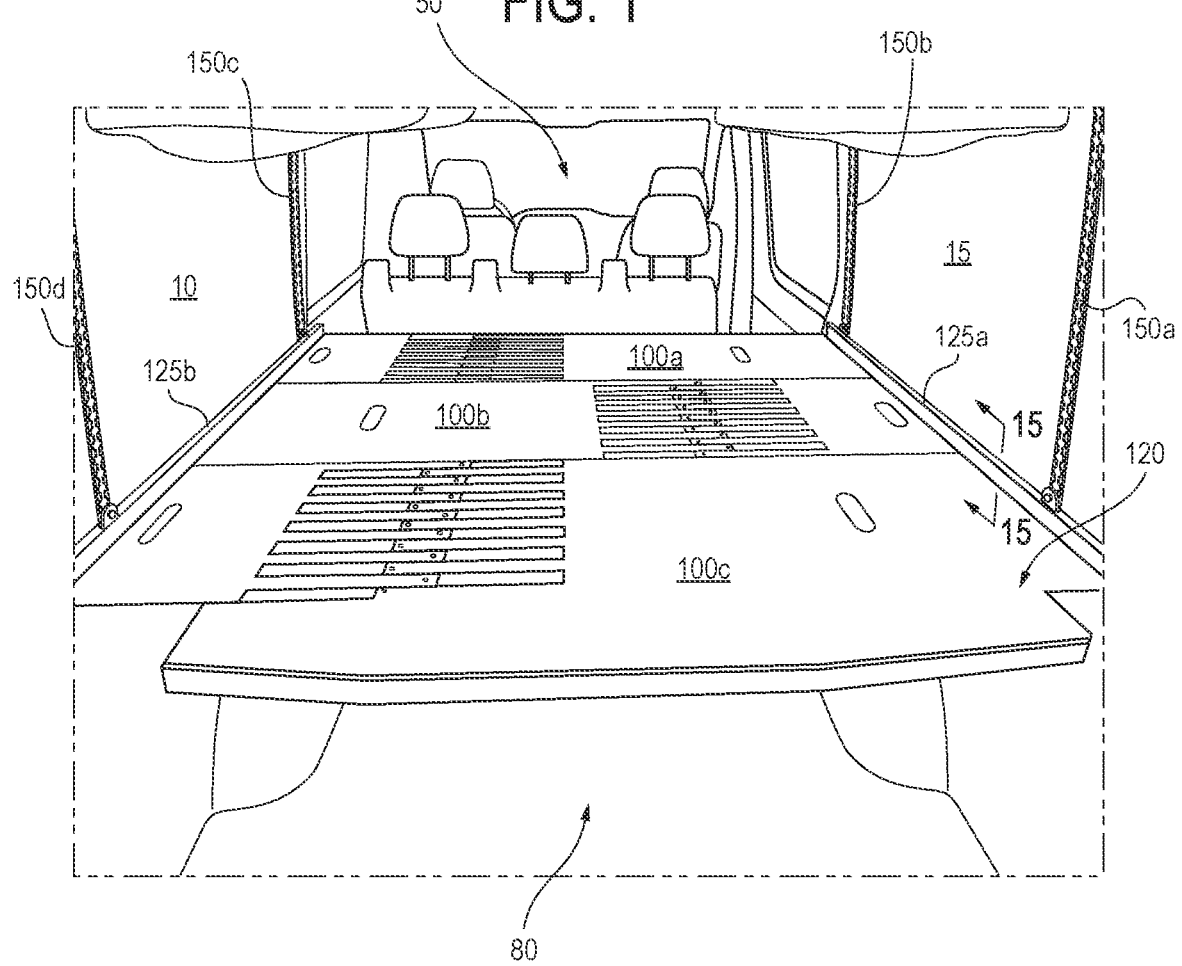
FIG. 1 is a partial perspective view of a portion of a vehicle interior illustrating a three-panel modular telescoping bed platform installed therein.

A telescoping bed platform for use in an enclosed or partly enclosed space, such as in a vehicle, is described herein. The platform has panels that telescope to permit installation of the bed platform into spaces of various sizes. More particularly, permitting portions of the panels to move relative to one another gives the overall platform a variable width, thereby permitting the platform to be installed into cargo spaces with a number of different widths. The ability of the individual panels to telescope also permits easy adjustment of the height at which the platform is installed. In this manner, the telescoping bed platform is usable in a number of different vehicles having differently configured cargo spaces.

By one approach, the variable bed platform has multiple panels that move relative to one another to expand or retract the size of the platform. To install, the bed platform the panels include coupling mechanisms for securing the individual panels forming the bed platform to the interior wall of the cargo space of the vehicle. Such coupling mechanisms include, for example, bed rails having a specific geometry installed along the cargo walls and corresponding geometry at the ends of the panels to permit the panels to be secured into the cargo space by attaching to the bed rails. Further, in some embodiments, a telescoping bed platform system also includes tracks installed along the walls of the cargo space, where the tracks can have the bed rails mounted thereto, such that the bed rails can be moved up and down along the tracks allowing repositioning of the bed platform to different heights within the cargo space.

In one illustrative embodiment, a modular bed platform 80 includes multiple panels 100. With regard to FIG. 1, a modular bed platform 80 having three individual bed platform panels 100a, 100b, and 100c is illustrated. The modular bed platform 80 is shown installed in a vehicle 50 having a first interior side wall 10 and a second interior side wall 15 opposite thereof. The vehicle 50 may be, for example, a Mercedes Sprinter van, a Ford Transit van, or any other vehicle with sufficient cargo space (i.e., sufficient horizontal and vertical dimensions) to accommodate a bed platform as described herein. The bed platform panels 100a, 100b, and 100c can extend and retract to increase and decrease their length (and thereby adjust the width of the modular bed platform 80) in order to properly fit varying widths of a vehicle such as vehicle 50.

By one approach, an individual panel 100 includes a panel surface 120 that is comprised of a first panel surface 144 and a second panel surface 160 with interleaved projections 126. The individual panels 100 each include a frame 122 having at least a first frame section 130 and a second frame section 132. In one embodiment, the first and second panel surfaces 144, 160 have coupling mechanisms associated therewith to secure the first and second panel surfaces to the interior walls of the cargo space of the vehicle 50. Further, the first and second panels surfaces 144, 160 are generally movable relative to one another to increase or decrease the length of the panel 100 and the overall width of the bed platform 80 comprised of the panels. To that end, the individual panels 100, in one illustrative embodiment, have a frame 122, which may be comprised of multiple pieces, such as a first frame section 130 associated with the first panel surface 144 and a second frame section 132 associated with the second panel surface 160. In one illustrative approach, the frame 122 associated with the panel 100 has multiple sections that telescope together.

In another configuration, an individual panel 100 also includes coupling element(s) or hardware that connects the individual panel 100 to the interior wall of the cargo space, as described further below. Depending on the configuration of the hardware, the coupling elements may be incorporated into the frame or may be an additional discrete structure. In addition, depending on the type of material comprising the panel surface 120, the hardware also may provide support or structural rigidity to the panel surface 120. For example, the frame 122 may also be used, in part, to facilitate coupling of the individual panels 100 to an interior wall of the cargo space and to reinforce the panel surface 120.

Figure 2:
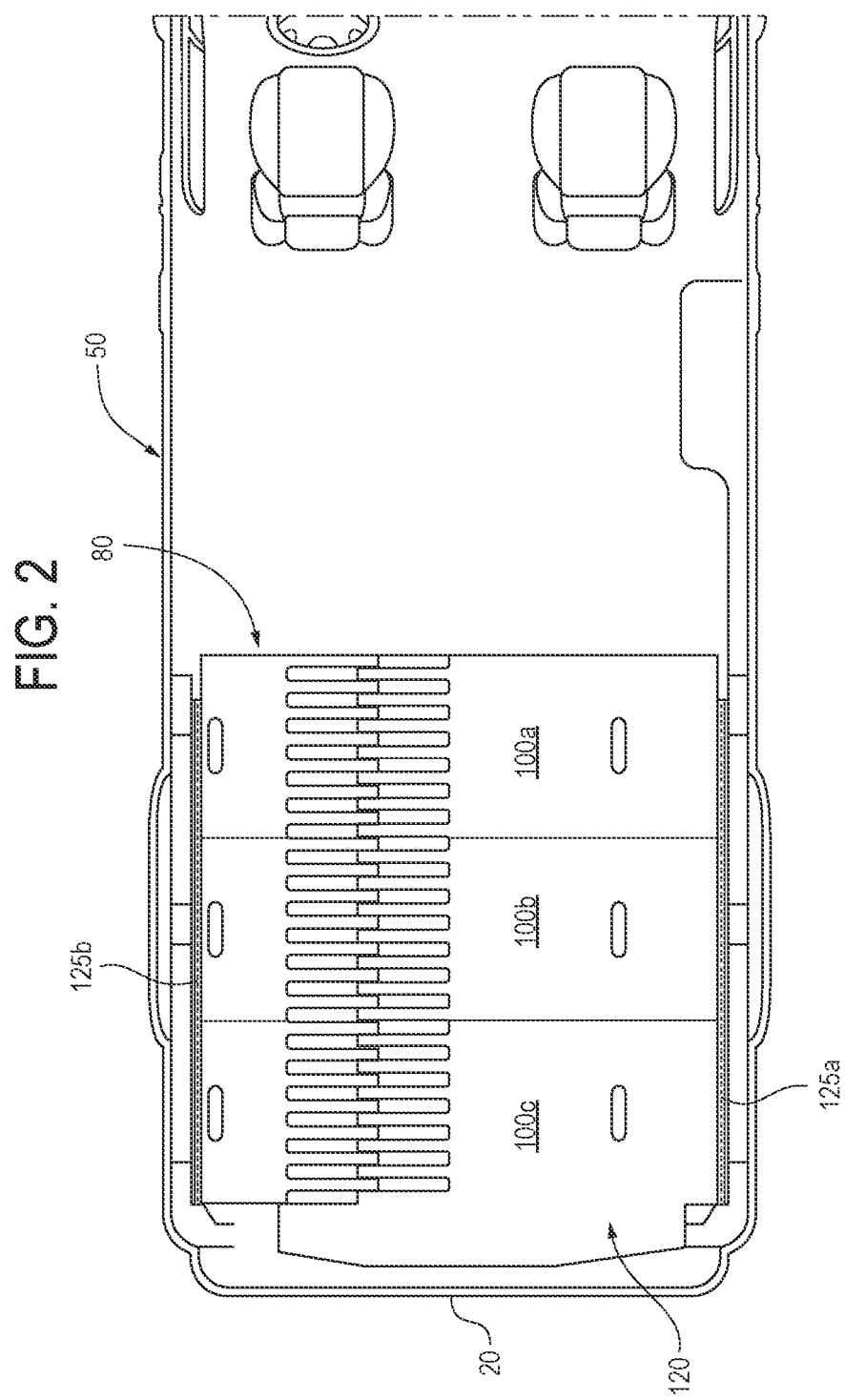
FIG. 2 is a top view of a three-panel modular telescoping bed platform installed in a vehicle.

The bed platform panels 100a, 100b, and 100c described herein can be scaled to a variety of dimensions to accommodate the various uses that will become apparent to one of ordinary skill in the art based on this disclosure. In some configurations, the bed platform panels 100a, 100b, and 100c have an adjustable length to accommodate users of various sizes or to fit various installation spaces. For example, the bed platform panel 100c is illustrated as having a both a wider and a narrower portion along its length, with the wider portion being designed to abut the rear door of the vehicle 50 thus creating a continuous bed platform that substantial abuts the walls 10, 15 of the vehicle as the rear wall 20 of the vehicle 50, as illustrated in FIG. 2. FIG. 2 illustrates a top view of an embodiment of a portion of the vehicle 50. As can be seen, the bed platform panels 100a, 100b, and 100c together form a nearly continuous surface within a portion of the cargo space of the vehicle 50, such that the modular bed platform 80 abuts the first and second side walls 10, 15 of the vehicle 50 and the rear wall 20 of the vehicle 50. The rear wall 20 of the vehicle may be formed in part, of, for example, one or more doors.

Figure 17:
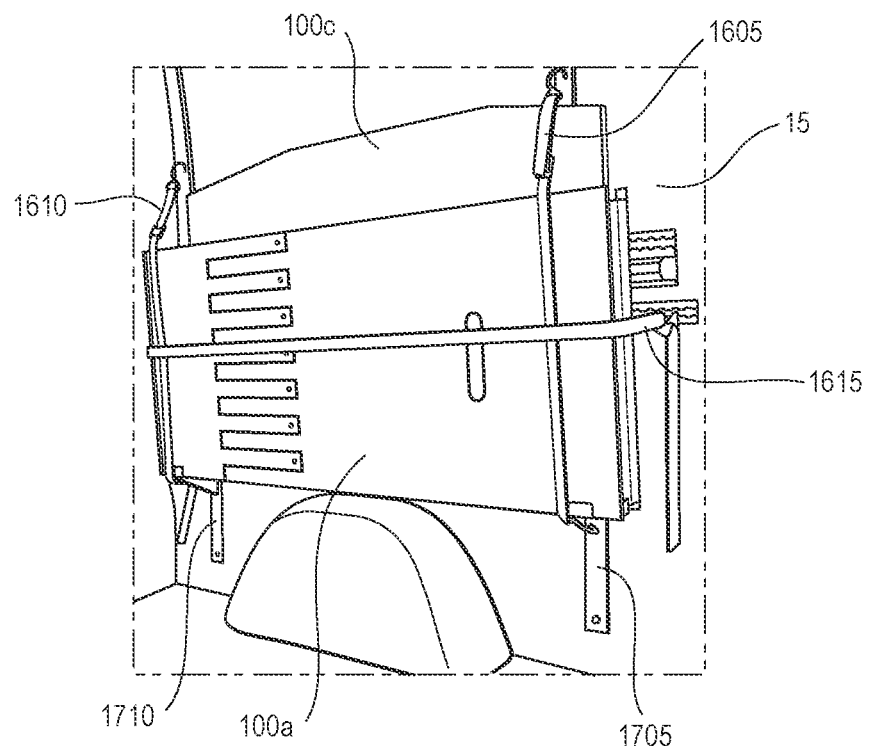
FIG. 17 illustrates the panels of the modular bed platform 80 in a stowed configuration.

FIG. 17 illustrates the panels 100a, 100b, and 100c in a stowed configuration against a wall 10, 15 of a cargo space. The panels are supported from the bottom by brackets 1705, 1710. The panels 100a, 100b, and 100c are held tight to the wall 10, 15 by straps 1605, 1610, and 1615.

Figure 16:
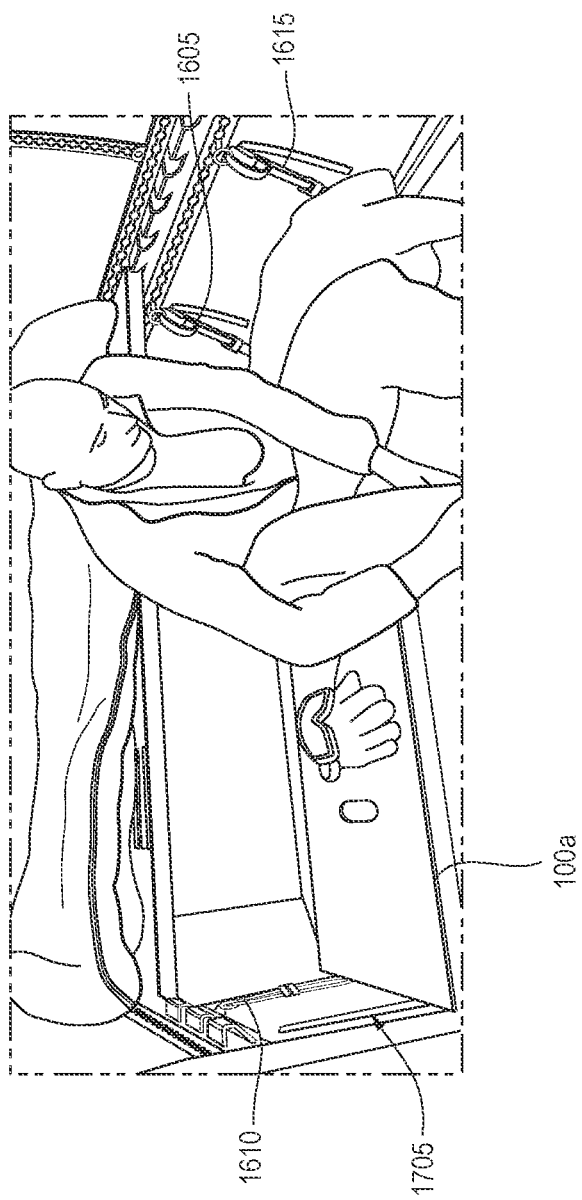
FIG. 16 is a perspective view of an individual panel 100 in a bench configuration.

Because individual panels 100a, 100b, 100c have an adjustable length as described in detail below, the individual ones of the panels 100a, 100b, 100c can be used in a bunk or a bed configuration using the straps 1605, 1610, 1615 and the brackets 1705, 1710. For example, as illustrated in FIG. 16 an individual one of the panels 100a, 100b, 100c may be oriented across the width of a cargo space to form a bench. In such a configuration, the individual one of the panels 100a, 100b, 100c may be coupled to a bed rail such as bed rail 125a and 125b via the straps 1605, 1610, 1615 with one corner of the bed resting on the a bracket such as bracket 1705.

Figure 18:
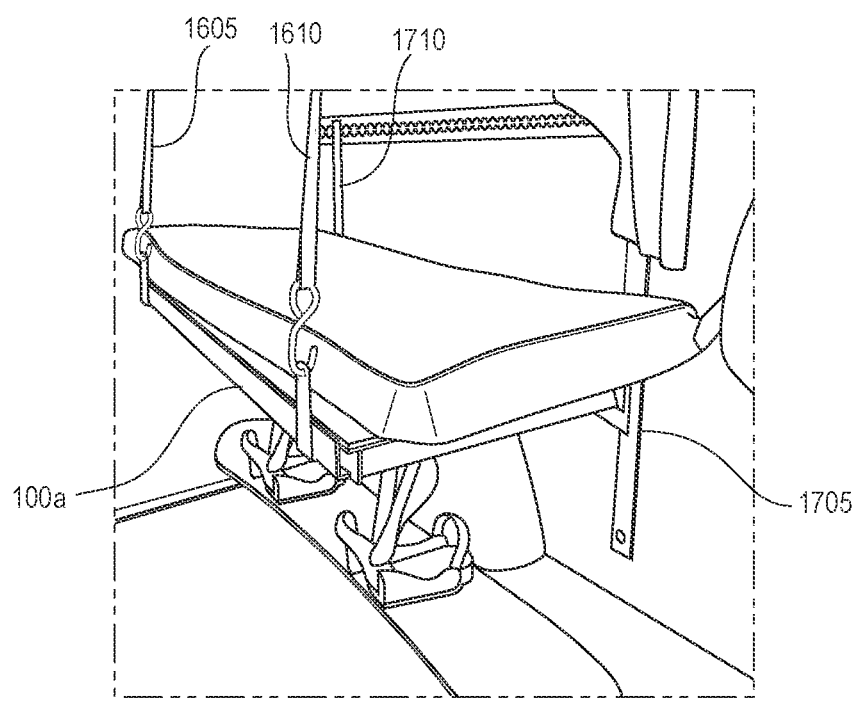
FIG. 18 illustrates an individual panel 100 in a bed configuration.

In another configuration, an individual one of the panels 100a, 100b, 100c may be oriented along the length of a cargo space to form a bunk as illustrated in FIG. 18. In such a configuration, the individual one of the panels 100a, 100b, 100c may be set across the brackets 1705, 1710 and supported on the opposite side of the side that is support by the brackets 1705, 1710 by straps such as the straps 1605, 1610. In both the bed and the bunk configuration straps may couple directly to the individual one of the panels 100a, 100b, 100c or be coupled to the individual one of the panels 100a, 100b, 100c through intermediary hardware. Likewise the straps may couple, at the end not coupled to the individual one of the panels 100a, 100b, 100c, directly or through intermediate hardware to the ceiling or walls of a cargo space, a track, such as vertical track 150b, or a bed rail, such as bed rail 125a or 125b.

In one illustrative configuration, the bed platform panels 100a, 100b, and 100c are coupled to the walls 10, 15 of the vehicle 50 via bed rails 125a and 125b. The bed rails 125a and 125b are in turn coupled to the walls 10, 15 of the vehicle 50 via tracks 150a, 150b, 150c, and 150d, such as horizontal or vertical tracks. In operation, the tracks 150a, 150b, 150c, 150d have a generally vertical orientation so that the tracks may be used to permit the height of the modular bed platform 80, or any individual panel 100, to be easily and quickly adjusted. By one approach, the vertical tracks 150a, 150b, 150c, 150d are secured directly to the walls 10, 15 of the vehicle 50, such as by, for example, screws, rivets, nails or similar securement mechanisms.

FIGS. 3 and 4 illustrate two different bed platform panels, 100a and 100c respectively. The panel 100a, shown in FIG. 3, is generally more narrow than the panel 100c, shown in FIG. 4. These, and other panels, may be combined together to form a modular bed platform 80. The bed platform panel 100a also corresponds to panel 100b. In addition to the width, the only other functional difference between the bed platform panels 100a and the bed platform panel 100c is the difference in the shape. In one illustrative approach, the panel portion 107, shown in FIG. 3, has a more consistent width along the length of the body (i.e., until the projections 129), as opposed to the shape of panel portion 109. As described above, with reference to FIG. 1 and FIG. 2 the shape of the panel portion 109 of the bed platform panel 100c has been modified so that it substantial abuts the rear wall 20 of the vehicle 50. Similarly, illustrated features between the panels 100a, 100b and the panel 100c are shared amongst each of the panels 100a, 100b, and 100c, and unless a structure is specifically distinguished the structures and functions of the panels 100a, 100b, and, 100c should be interpreted as being substantially identical. This detailed description will proceed by describing the structures and functions of the panel 100a, but it should be understood that the panels 100b and 100c also have similar structures and functions.

In one configuration, the bed platform panel 100a, shown in FIGS. 3 and 5 has two panel portions 105, 107 that are movable relative to one another. By one approach, the panel portions 105 and 107 have portions that telescope relative to one another. FIG. 3 illustrates the panel portions 105, 107 in a fully nested, contracted, or retracted position relative to one another, and FIG. 5 illustrates the panel portions 105, 107 in a fully extended position relative to one another. In one illustrative embodiment, the panel portions 105, 107 each have a handle portion or opening 168, 166 that allow a user to easily grasp and manipulate the bed platform panels 100a. As illustrated, the panel portions 105, 107 also have a number of tines, slats, or projections 128, 129 that are arranged alternately with one another as illustrated, for example, in FIG. 3. The panel portions 105 and 107 may have more or less tines, slats, or projections than illustrated in for, example, FIG. 3. When the panel portions 105, 107 of the bed platform panels 100a are separated by lateral motion from one another, free space or an opening 110 is created between the tines, slats, or projections 129. The alternating projections 128, 129 permits the modular platform bed 80 formed of the panels 100 to be expanded or retracted to properly fit within a cargo space, while still providing firm support for a mattress, one or more individuals, and/or for support of baggage or cargo, among other items.

Figure 6:
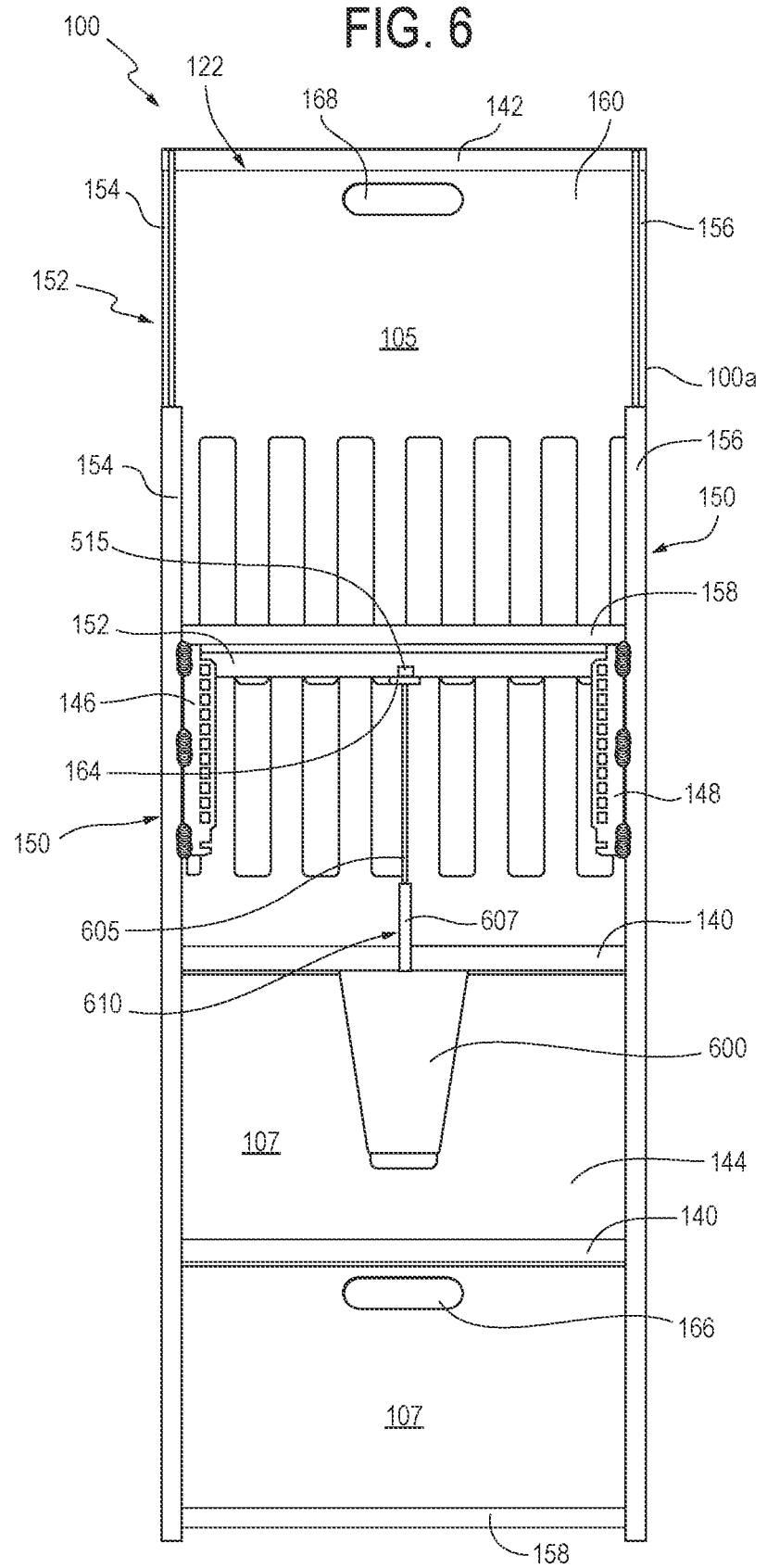
FIG. 6 is a bottom view illustrating an individual panel of a modular telescoping bed platform, the panel being in an open, extended position.

FIG. 6 illustrates the underside of the bed platform panel 100a. FIG. 6 illustrates the bed platform panel 100a in a fully extended position with the panel portions 105, 107 partially pulled apart from one another. As shown on the underside thereof, the panel portion 107 has a the first frame section 130 associated therewith. The first frame section 130 includes outer parallel frame members 134, 136 running parallel to each other parallel to the edges of the panel portion 107. By one approach, the frame portions 134, 136 are adjacent the outer edge of the first panel surface 144, whereas in other configurations, the frame portions 134, 136 may be disposed a distance from the edge of the first panel surface 144. The frame members 134, 136 are connected to each other and fixed relative to one another, at least in part, by cross members 138, 140 and end member 142 as illustrated in FIG. 6. In one illustrative embodiment, the panel portion 107 has a first panel surface 144 that may include a rigid, upper surface portion. The rigid first panel surface 144 may be, for example, a laminate, metal, composite material, or a wood such as bamboo, among other materials. The projections 128, 129 may be formed out of the rigid surface portion as illustrated in FIG. 3. The first panel surface 144 may be secured to the frame portions 134, 136 of the frame 130 by means of, for example, nuts and bolts, screws, rivets, welding, or an adhesive.

In some embodiments, the first frame section 130 also has a latch receiver plates 146, 148 mounted to outer parallel frame members 134, 136 respectively. By one approach, the latch receiver plates 146, 148 receive a latch mounted to the cross member 152 of the panel portion 105 and together with the latch the latch receiver plates 146, 148 prevent the bed platform panels 100a and the portions thereof 105, 107 from moving relative to one another, i.e., extending or retracting. The latch receiver plates 146, 148 have a number of intermediate locking position along their length illustrated by square openings and the final locking position illustrated as a deep indent. When the bed platform panels 100a are fully retracted, the latch can be inserted into the deep indent to keep the bed platform panels 100a in a fully retracted position.

The panel portion 105, as shown in FIG. 6, also has an inner parallel frame portions 154, 156 disposed along opposing, lateral edges of the panel portion 105, as illustrated. The outer parallel frame members 134, 136, in one configuration, are generally sized to receive at least a portion of the inner parallel frame members 154, 156. By one approach, the outer parallel frame portions 134, 136 have a generally rectangular cross section with a pair of inward facing walls on each of the respective frame portions 134, 136. In use, the inner parallel frame portions 154, 156 may telescope into and out of the outer parallel frame members 134, 136 in the lateral direction. The inner parallel frame portions 154, 156 are connected, at least in part, to each other via an end member 142. The end member 142 is connected to the cross member 152 via a rigid surface structure 160. The rigid surface structure 160 may be connected to the cross member 152 by means of, for example, nuts and bolts, screws, rivets, welding, or an adhesive. The rigid surface portion 160 may be, for example, a laminate, metal, composite material, or a wood such as bamboo, among other materials. The projections 128 may be formed out of the rigid surface portion as illustrated in FIG. 3.

Figure 7:
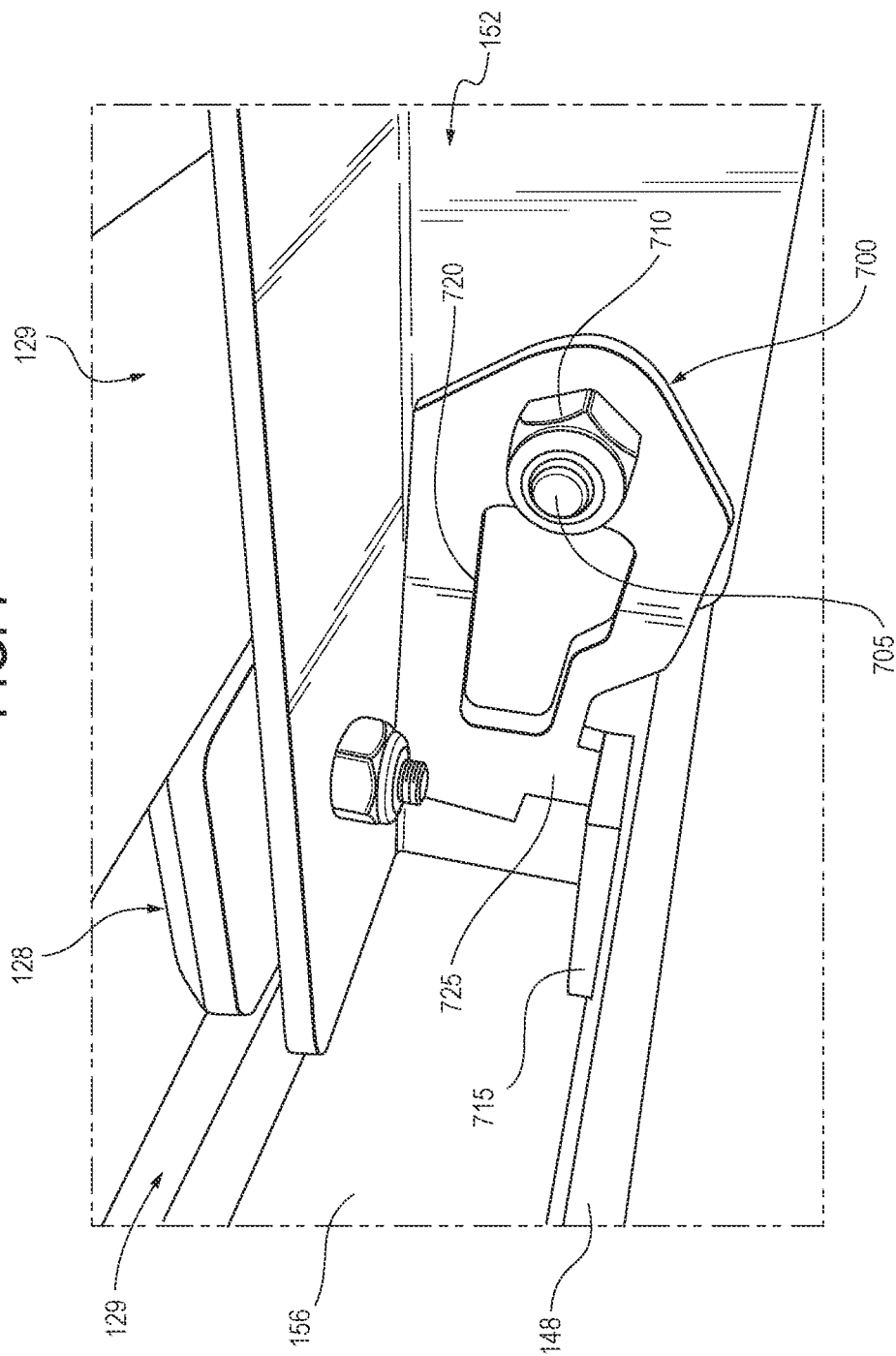
FIGS. 7 and 8 are partial perspective views illustrating the latching mechanism of an individual panel of a modular telescoping bed platform in an unlatched configuration and a latched configuration, respectively.

In one illustrative approach, the projections 128 of the panel portion 105 each are each secured to the cross member 152 such that the cross member 152 sits between the projections 129 and latch receiver plates 146, 148 as illustrated in FIG. 7 (view of the bottom of the panel, the bottom facing the ground). In an alternative embodiment, the inward facing walls of the frame members 134, 136 may be cut away in the portion running approximately the length of the latch receiver plates 146, 148. By one approach, the cross member 152 connects to the inner parallel frame members 154, 156 through the cut away portion of the frame members 134, 136. In one embodiment, the panel portion 107 also includes a piston arm 605 and tensioning device 610 so that the panel portions 105, 107 are biased to a fully extended position, such as shown partly in FIG. 5. In some embodiments, the cross member 152 further include a tab 164 (FIG. 6) that extends orthogonal to the rigid surface portions 160, 144 if the bed platform panel 100a for receiving the piston arm 605 of a tensioning device 610 (see, e.g., FIG. 6).

By one approach, a tensioning device 610 may take the form of a hydraulic piston such as a gas piston. In one embodiment, the tensioning device 610 is contained in and coupled to piston housing 600. The piston housing is mounted to one of the cross members 140 and provides a constant force biasing the bed platform panels 100a towards the fully extended position. Thus, if not locked into position, the bed panel portions 105, 107 will fully extend to their longest most length of the panel 100a. In one configuration, the tensioning device 610 comprises a piston arm 605 and a piston receiving barrel 607 such that the piston arm 605 is mounted to the tab 164 via, for example a bolt 515 that screws onto the end of the piston arm.

FIG. 7 illustrates one of the latches 700 corresponding to the latch receiver plates 146, 148, which can be used to secure the panel portions 105, 107 relative to one another such that they are prevented from extending relative to one another. The latch 700, by one approach, is secured to the cross member 152 via a bolt 710 and screw 705. As illustrated, the latch 700 has a hollow portion 720 that permits users to easily grasp and manipulate the latch 700 and a head portion 720 for inserting a projection of the head portion 720 into the latch receiving structures of the latch receiver plates 146, 148 discussed above and illustrated in FIG. 6. Tab 715 prevents the latch 700 from bending too far and breaking or becoming inoperable. The tab 715 is coupled or integral to the cross member 152.

Figure 8:
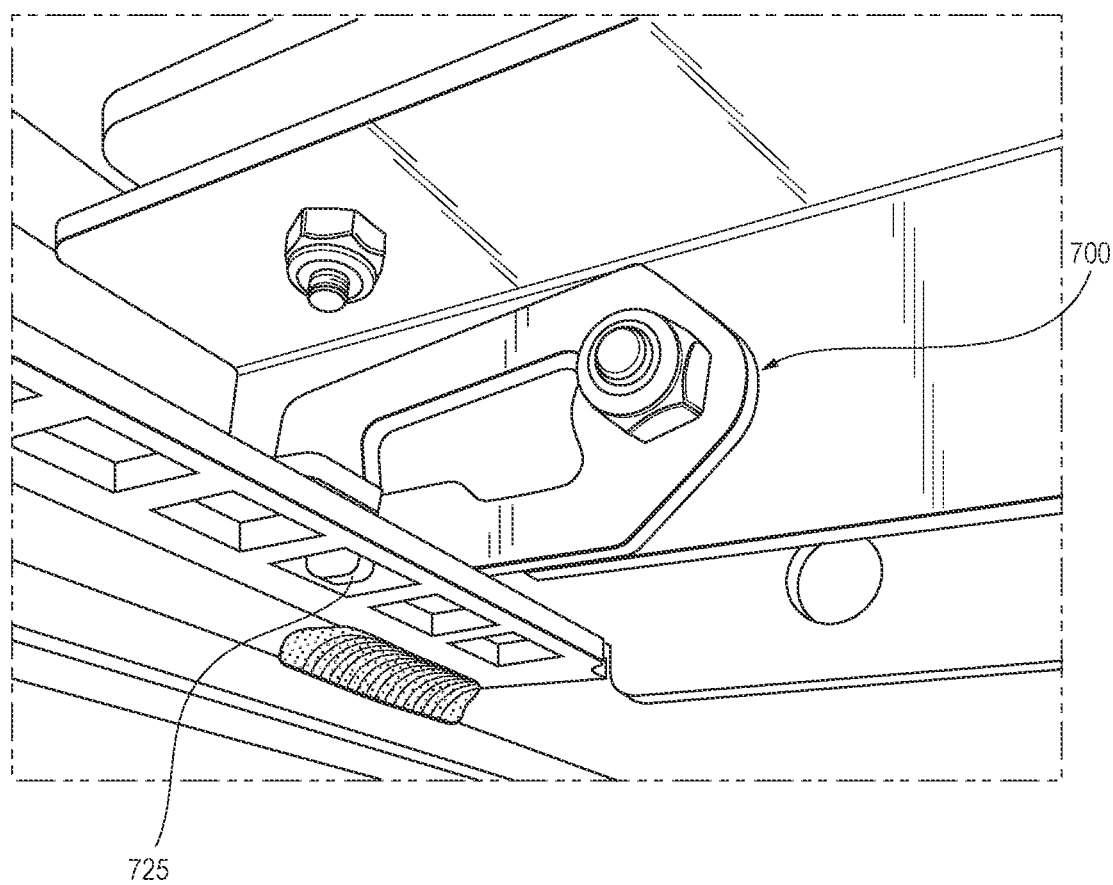

FIG. 8 illustrates the head portion 725 of the latch 700 in a latched or secured position. More specifically, in the latch configuration, the latch 700 prevents the bed platform panel portions 105, 107 from moving relative to one another, i.e., extending or retracting the panel.

Figure 9:
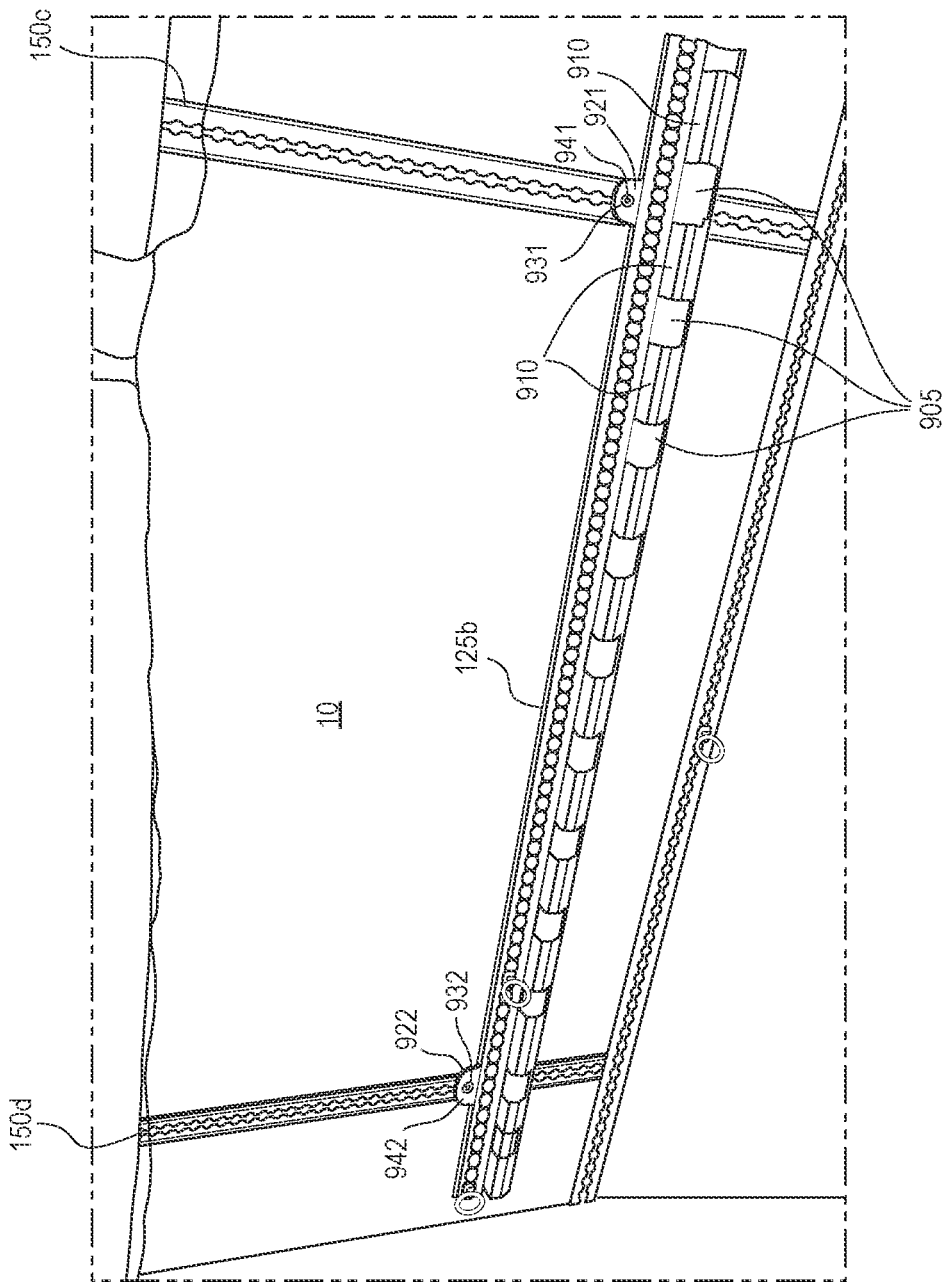
FIG. 9 is a partial perspective view illustrating a bed rail and track installed on a cargo wall of a van for mounting the panels of a modular telescoping bed platform to the walls of the vehicle

As mentioned above, the platform panels 100 may be secured relative to the interior cargo area of the vehicle 50 via coupling mechanism such as, for example, rails and tracks. FIG. 9 illustrates one exemplary bed rail 125*b*, which is secured or attached to optional vertical tracks 150*c* and 150*d* disposed on an interior wall of a cargo area. While FIG. 9 illustrates the bedrail 125*b* is associated with vertical tracks 150*c*. 150*d*, the bedrails 125 also may be secured directly to the interior wall of the cargo area of the vehicle in some configurations.

Figure 11:
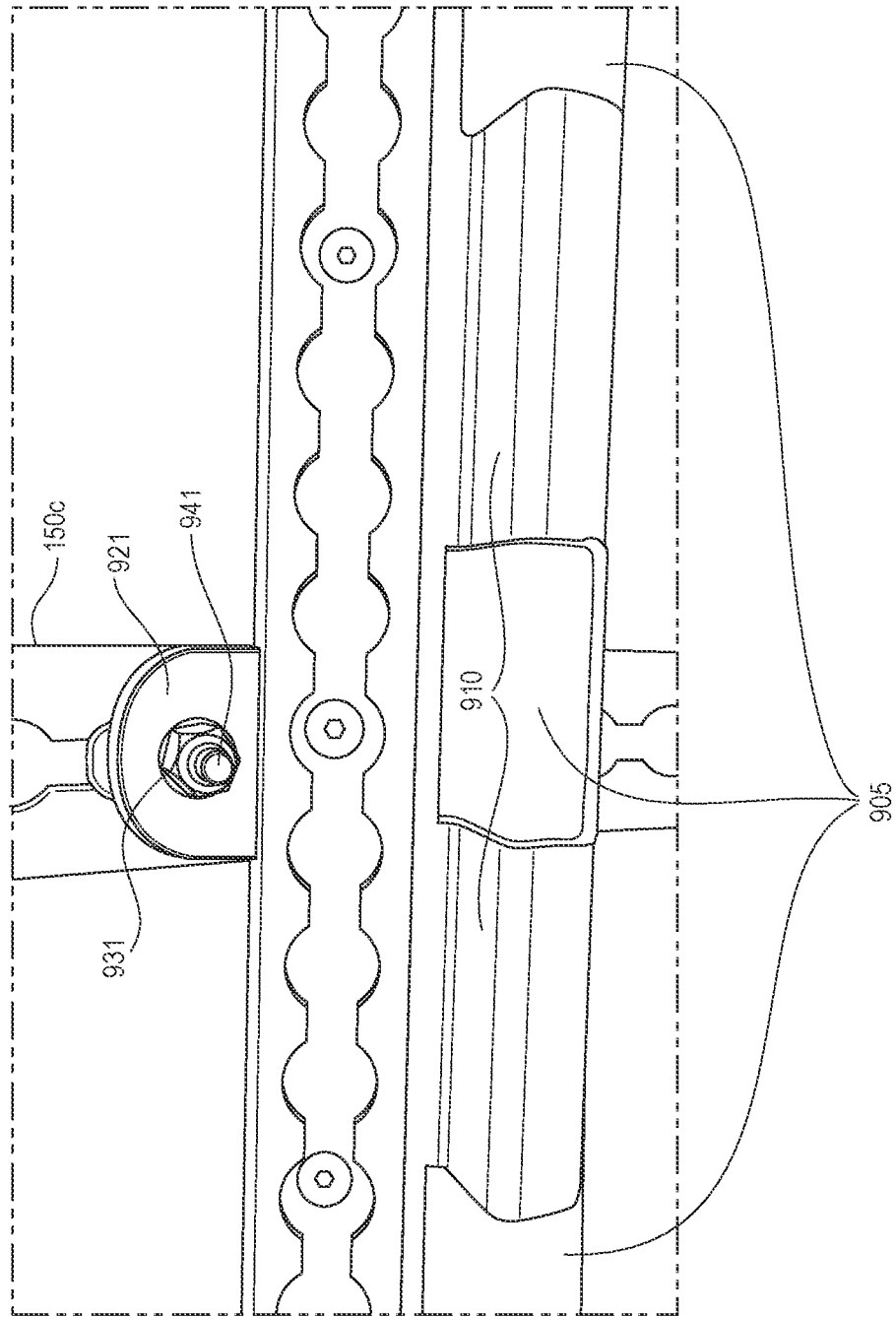
FIG. 11 is a partial perspective view of a bed rail secured to the vehicle wall via a mounting mechanism.

In one illustrative installed configuration, the bed rail 125*b* is secured or mounted to the vertical rails 150*c*, 150*d* using two bolts 931, 932. By one approach, the bolts 931, 932 are adjacent a pair of tabs 921, 922. The tabs 921, 922 are, for example, integrally formed on or welded on the bed rail 125*b* and may reinforce or otherwise help secure the bed rail 125*b*. The bolts 931, 932 couple to screw posts 941, 942 extending from the vertical tracks 150*c*, 150*d*. FIG. 11 illustrates a close up view of a single such coupling between the vertical rail 150*c* and the bed rail 125*b*. FIG. 9 illustrates the tracks or rails 150*c*, 150*d* having a slot within which extension portions of the bed rails (e.g., the bolts 931, 932 and screw posts 941, 942) are configured to move to permit the bed rail 125*b* to be adjusted along the height or length of the first and second pair of tracks. By one approach, the bedrail 125*b* and tracks 150*c*, 150*d* may be formed of a variety of materials, such as, for example, metal, such as steel, or composite materials, among others.

Figure 10:
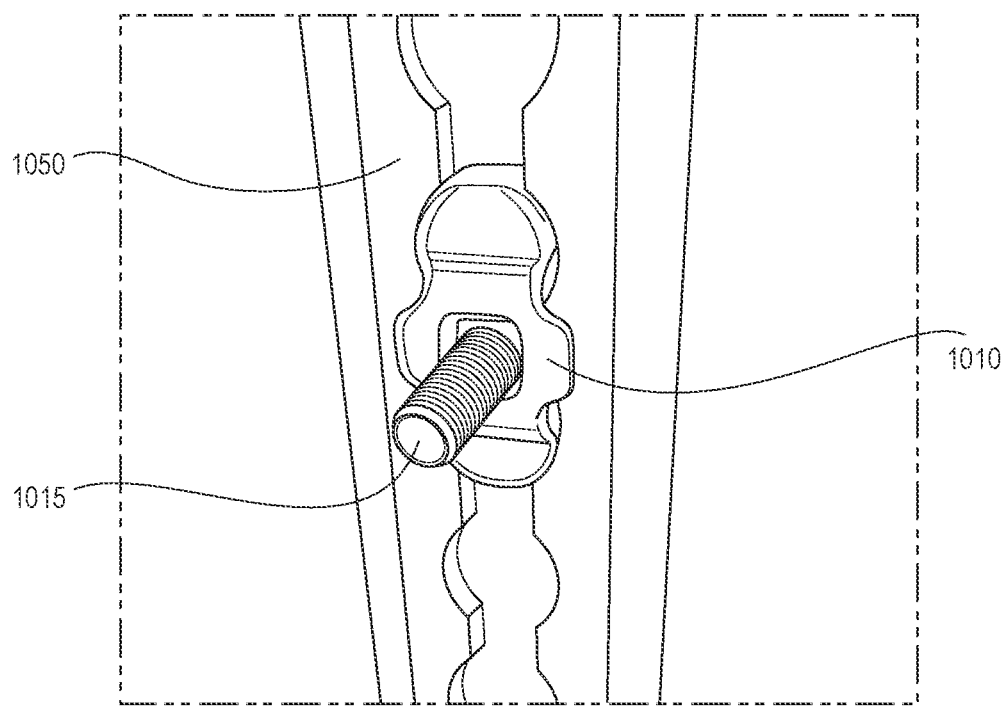
FIG. 10 is a partial perspective view illustrating the mounting mechanism for the bed rail.

FIG. 10 illustrates vertical track 1050 that corresponds to the vertical tracks 150*a*, 150*b*, 150*c*, 150*d* mentioned above. Further, screw post 1015 corresponds to the screw posts 941, 942. The screw post carriage 1010 extends perpendicular to the surface of the vertical track 1050 and sits in a screw post carriage 1010. Screw post carriage 1010 can travel freely within the vertical rail 1050 when a bed rail such as bed rail 125*b* is not secured in place with a bolt. However, when the bolt is torqued down on the screw post 1015 the screw post carriage 1010 becomes locked into position within the vertical track 1050. The ability to easily move the screw post carriage 1010 up and down the vertical track 1050 makes it easy to adjust the height at which, for example, the bed platform panels 100*a* are installed.

Returning to FIG. 9, the bed rail 125*b*, like the bed rail 125*a*, has both frame receiving sections 905 and bed platform end portion coupling sections 910 running the length of the bed rail. The frame receiving sections 905 receive the frame portions 154, 156, 134, 136 of the bed platform panel 100*a* while the bed platform end portion coupling sections 910 may be bulbous projections that extend into the end portions 158 and 142 of the bed platform panel 100*a* and to which the platform panel may be secured.

Figure 12:
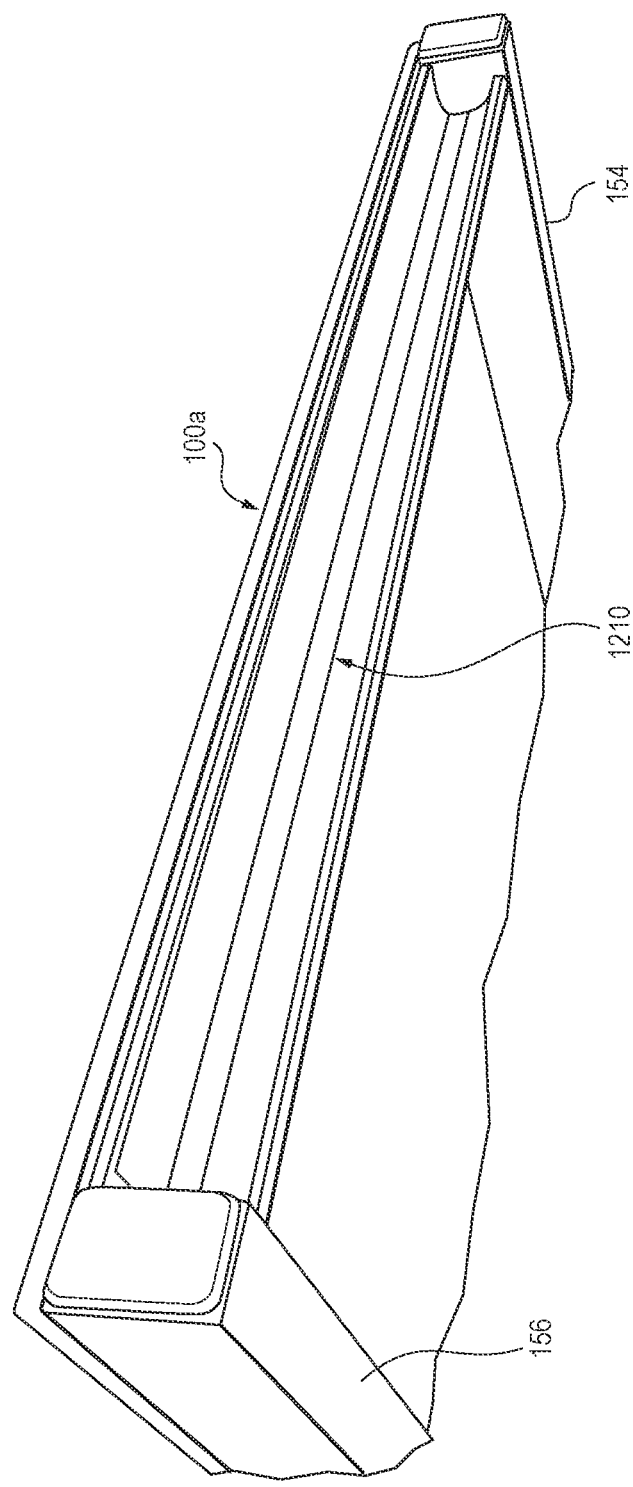
FIG. 12 is a partial perspective view illustrating an end portion of an individual panel of a modular telescoping bed platform.
Figure 13:
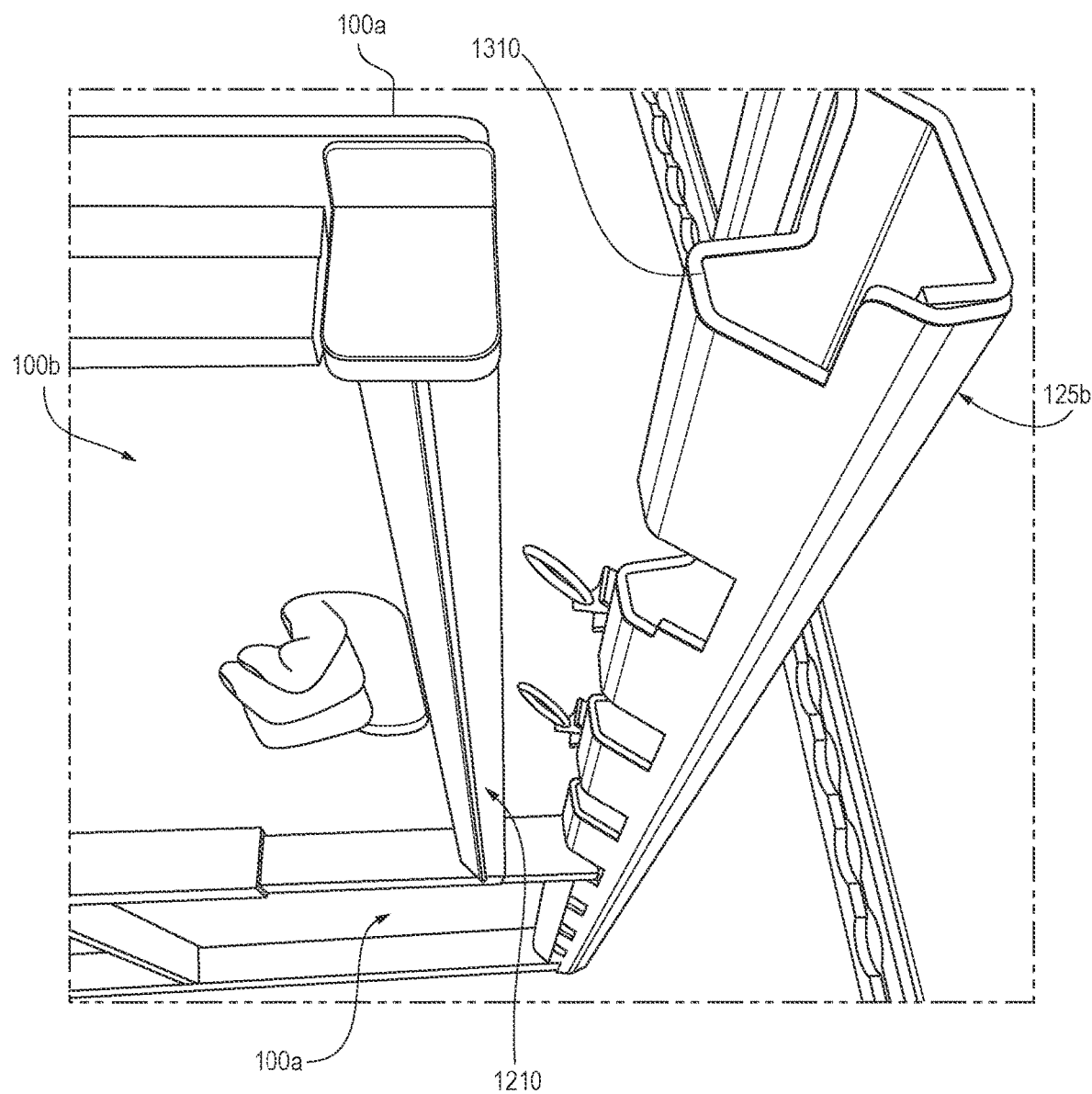
FIG. 13 is a partial perspective view illustrating the coupling mechanism of an end portion of an individual panel as it is being brought into contact with a bed rail.
Figure 14:
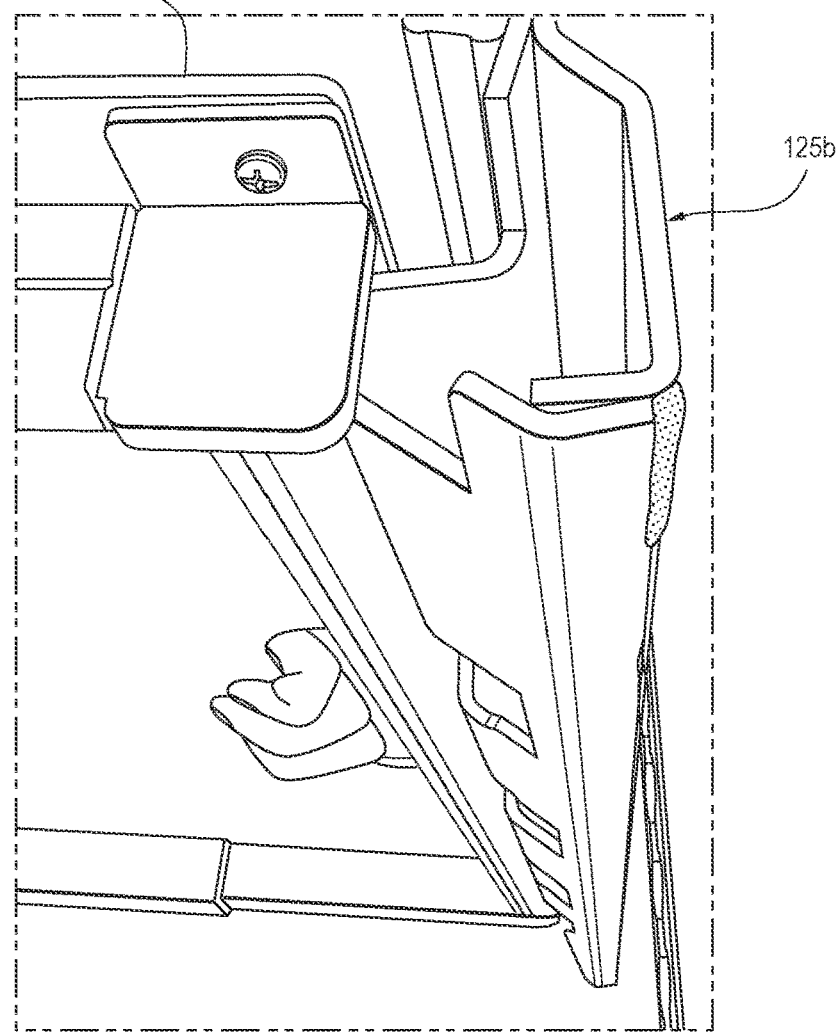
FIG. 14 is a partial perspective view illustrating the end portion of the individual panel of FIG. 13 coupling the end portion of the bed rail.
Figure 15:
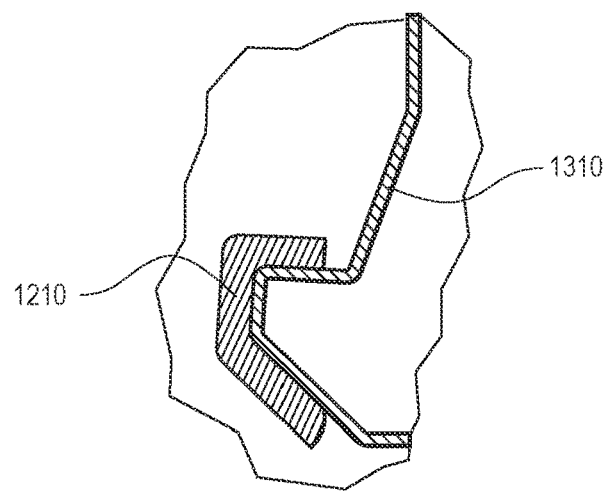
FIG. 15 is a partial cross sectional view of a portion of a bed rail mated to the end portion of a bed platform panel taken across line 15-15 of FIG. 1.

FIG. 12 illustrates the end of the bed platform panel 100*a*. The end or mounting portion 1210 has a duck-beak-like structure corresponding to the contour 1310 of the bed rail 125*b* as illustrated in FIG. 13. By one approach, the end or mounting portion 1210 with the corresponding duck-beak-like structure has a top wing or extension and a bottom wing or extension such that the end portion 1210 has a substantially c-like cross section, as illustrated in FIG. 15. More particularly, a cross section taken across line 15-15 of FIG. 1 illustrates the end portion 1210 mated with the contour 1310 of the bed rail 125*a* in FIG. 15. The end portion 142, 158 both have the above described duck-beak-like structure shown in FIG. 15. The end or mounting portion 1210 attaches onto or secures to the bed rail 125*b* due to their corresponding duck-beak-like structures and thus forms a superior couple to the bed rail 125*b* as opposed to previous mounting structures. FIG. 14 illustrates a user mounting a bed platform panel such as bed platform panel 100*a* to a bed rail such as bed rail 125*b*. As the bed platform panel 100*a* is [slide] slid into place and lowered into a horizontal position, the bed platform panel 100*a* attaches onto the bed rail 125*b*.

All methods described herein can be performed in any suitable order unless otherwise indicated herein or otherwise clearly contradicted by context. The use of any and all examples, or language describing an example (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. A modular bed platform panel having a length and a width and comprising:
    a first panel portion, a second panel portion, and a plurality of interleaving projections arranged across the width of the bed platform panel and across a portion of the length of the bed platform panel, wherein the first panel portion is configured to move relative to the second panel portion, such that the length of the bed platform is increased or decreased by the relative movement of the first and second panel portions; and
    a telescoping frame including a first frame portion and a second frame portion, wherein the first panel portion is coupled to the first frame portion and the second panel portion is coupled to the second frame portion; said first panel portion being larger than said second panel portion, wherein the second frame portion telescopes out of the first frame portion;
    wherein each of the first frame portion and the second frame portion include a bed rail mounting portion.

2. The modular bed platform of claim 1, wherein the first frame portion includes a pair of generally parallel first frame members disposed along opposing lateral edges of the first panel portion, and wherein the second frame portion includes a pair of generally parallel second frame members disposed along opposing lateral edges of the second panel portion.

3. The modular bed platform of claim 1, wherein each of the first panel portion and the second panel portion may be affixed to the first frame portion and second frame portion using a plurality of bolts.

4. The modular bed platform of claim 1, a rigid portion of the first panel portion comprising a laminate material.

5. The modular bed platform of claim 1, a rigid portion of the first panel portion comprising bamboo.

6. The modular bed platform of claim 1, wherein each mounting portion of the first frame portion and the second frame portion has a generally C-shaped cross-section.

7. The modular bed platform panel of claim 1, wherein the modular bed platform panel supports a mattress.

8. The modular bed platform panel of claim 1, each mounting portion of the first frame portion and the second frame portion including a plurality of hooks.

9. The modular bed platform of claim 6, each of the pair of bed rails having a bulbous projection to which the platform panel may be secured.

10. The modular bed platform of claim 8, each of the pair of bed rails having a bulbous projection to which the platform panel may be secured.

11. A modular bed system, comprising:
a first adjustable panel having a length and a width, the first adjustable panel comprising:
a first panel portion and a second panel portion, wherein the first and second panel portion are capable of telescoping movement relative to one another, wherein the first and second panel portions are configured such that the length of the first adjustable panel is increased or decreased when said second panel portion and said first panel portion engage in telescoping motion relative to one another,
a mounting portion at each end of the first adjustable panel; and
a pair of bed rails, the mounting portions engageable in a mounting relationship relative to said bed rails.

12. The modular bed system of claim 11, wherein the pair of bed rails are mountable to interior vehicle walls.

13. The modular bed system of claim 12, wherein the first adjustable panel includes a plurality of interleaving projections arranged across the width of the first adjustable panel and across a portion of the length of the first adjustable panel.

14. The modular bed system of claim 13, wherein one of the mounting portions is at one end of the first panel portion and another of the mounting portions is at one end of the second panel portion.

15. The modular bed system of claim 11, wherein the pair of bed rails are secured to opposing interior vehicle walls.

16. The modular bed system of claim 11, the first adjustable panel further including a pair of openings dimensioned to enable manual manipulation of the modular bed platform panel.

17. The modular bed system of claim 11, wherein each bed rail includes a plurality of openings, and wherein the modular bed system includes a securement feature cooperating with said openings, thereby inhibiting translation of the first adjustable panel.

18. The modular bed system of claim 11, wherein each bedrail includes at least one rail projection to which the first adjustable panel is secured.

19. The modular bed system of claim 18, wherein a shape of the rail projection is complimentary to a shape of the mounting portion at each of end of the first adjustable panel, such that the rail projection and the mounting portion interlock when the first adjustable panel is installed.

20. The modular bed system of claim 11, further including a second adjustable panel comprising a first panel portion and a second panel portion, wherein the first and second panel portion are capable of telescoping movement relative to one another, wherein the first and second panel portions are configured such that the length of the second adjustable panel is increased or decreased when said second panel portion and said first panel portion engage in telescoping motion relative to one another, and a mounting portion at each end of the second adjustable panel.

21. The modular bed system of claim 11, the first adjustable panel further including a pair of openings dimensioned to enable manual manipulation of the modular bed platform panel, and wherein one of the mounting portions is at one end of the first panel portion and another of the mounting portions is at one end of the second panel portion, wherein the pair of bed rails are secured to opposing interior vehicle walls, and wherein each bed rail includes a plurality of openings, and wherein the modular bed system includes a securement feature cooperating with said openings, thereby inhibiting translation of the first adjustable panel.

22. The modular bed system of claim 21, wherein each bedrail includes at least one rail projection to which the first adjustable panel is secured, and wherein a shape of the rail projection is complimentary to a shape of the mounting portion at each of end of the first adjustable panel, such that the rail projection and the mounting portion interlock when the first adjustable panel is installed.

23. The modular bed system of claim 21, further including a second adjustable panel comprising a first panel portion and a second panel portion, wherein the first and second panel portion are capable of telescoping movement relative to one another, wherein the first and second panel portions are configured such that the length of the second adjustable panel is increased or decreased when said second panel portion and said first panel portion engage in telescoping motion relative to one another, and a mounting portion at each end of the second adjustable panel.

\* \* \* \* \*

UNITED STATES PATENT AND TRADEMARK OFFICE
CERTIFICATE OF CORRECTION

PATENT NO. : 12,291,170 B2
APPLICATION NO. : 17/870602
DATED : May 6, 2025
INVENTOR(S) : Chad Smith It is certified that error appears in the above-identified patent and that said Letters Patent is hereby corrected as shown below:

On the Title Page

1. Item (57), under "Abstract", in Column 2, Lines 2-3, delete "such as, a cargo space of a vehicle, such as, a van, camper, or truck," and insert -- such as a cargo space of a vehicle, such as a van, camper, or truck, --, therefor.

2. On Page 3, item (56), under "Other Publications", in Column 2, Lines 5-6, delete "Admision" and insert -- Admission --, therefor.

3. On Page 3, item (56), under "Other Publications", in Column 2, Line 14, delete "Invalidty" and insert -- Invalidity --, therefor.

4. On Page 3, item (56), under "Other Publications", in Column 2, Line 20, delete "2018, retreived Mar. 27, 2023." and insert -- 2018, retrieved Mar. 27, 2023. --, therefor.

5. On Page 3, item (56), under "Other Publications", in Column 2, Line 20, delete "retreived" and insert -- retrieved --, therefor.

6. On Page 3, item (56), under "Other Publications", in Column 2, Line 25, delete "retreived" and insert -- retrieved --, therefor.

7. On Page 3, item (56), under "Other Publications", in Column 2, Line 30, delete "retreived" and insert -- retrieved --, therefor.

In the Claims

8. In Column 9, Claim 11, Line 32, delete "portion are" and insert -- portions are --, therefor.

Signed and Sealed this
Twenty-fourth Day of June, 2025

Coke Morgan Stewart
*Acting Director of the United States Patent and Trademark Office*

9. In Column 10, Claim 20, Line 20, delete "portion are" and insert -- portions are --, therefor.

10. In Column 10, Claim 23, Line 48, delete "portion are" and insert -- portions are --, therefor.